United States Patent
Takahashi et al.

(10) Patent No.: US 11,699,229 B2
(45) Date of Patent: Jul. 11, 2023

(54) MEDICAL IMAGE PROCESSING APPARATUS AND MEDICAL IMAGE PROCESSING METHOD

(71) Applicant: Hitachi, Ltd., Tokyo (JP)

(72) Inventors: Hisashi Takahashi, Tokyo (JP); Taiga Gotou, Tokyo (JP)

(73) Assignee: FUJIFILM HEALTHCARE CORPORATION, Chiba (JP)

( * ) Notice: Subject to any disclaimer, the term of this patent is extended or adjusted under 35 U.S.C. 154(b) by 54 days.

(21) Appl. No.: 16/889,933

(22) Filed: Jun. 2, 2020

(65) Prior Publication Data

US 2021/0056686 A1   Feb. 25, 2021

(30) Foreign Application Priority Data

Aug. 21, 2019  (JP) .................................. 2019-150822

(51) Int. Cl.
*G06T 7/00* (2017.01)
*G06T 5/00* (2006.01)

(52) U.S. Cl.
CPC ............ *G06T 7/0012* (2013.01); *G06T 5/002* (2013.01); *G06T 2207/10081* (2013.01); *G06T 2207/20182* (2013.01); *G06T 2207/30004* (2013.01)

(58) Field of Classification Search
CPC .................... G06T 7/0012; G06T 5/002; G06T 2207/10081; G06T 2207/20182; G06T 2207/30004
See application file for complete search history.

(56) References Cited

U.S. PATENT DOCUMENTS

| | | | | |
|---|---|---|---|---|
| 5,933,250 A | * | 8/1999 | Ito | H04N 1/502 358/481 |
| 5,933,540 A | * | 8/1999 | Lakshminarayanan | H04N 1/4092 382/128 |
| 6,731,806 B1 | * | 5/2004 | Gindele | G06T 5/20 382/275 |
| 8,199,233 B2 | * | 6/2012 | Shoyama | H04N 5/3532 348/308 |
| 8,520,916 B2 | * | 8/2013 | Huo | G06T 5/008 382/128 |
| 9,846,937 B1 | * | 12/2017 | Sharma | G06T 5/002 |
| 2004/0066978 A1 | * | 4/2004 | Nanbu | G06T 5/50 382/128 |
| 2007/0145317 A9 | * | 6/2007 | Kobayashi | F16K 39/04 251/129.15 |
| 2010/0259650 A1 | * | 10/2010 | Sasaki | H04N 23/81 348/241 |

(Continued)

FOREIGN PATENT DOCUMENTS

JP   4688269 B2   5/2011

*Primary Examiner* — Edward F Urban
*Assistant Examiner* — Duy Tran
(74) *Attorney, Agent, or Firm* — Baker Botts L.L.P.

(57) ABSTRACT

A medical image processing apparatus reducing noise of a medical image acquired includes a smoothing unit forming a smoothed image of the medical image, a route forming unit forming a route that is a pixel group positioned continuously in the smoothed image and fulfills a route condition, and a noise reducing unit extracting a pixel group corresponding to the route in the medical image and reducing noise of the medical image based on the extracted pixel group.

9 Claims, 11 Drawing Sheets

(56) References Cited

U.S. PATENT DOCUMENTS

| | | | | |
|---|---|---|---|---|
| 2010/0272340 A1* | 10/2010 | Bar-Aviv | ............ | G06T 5/20 |
| | | | | 382/262 |
| 2011/0110566 A1* | 5/2011 | Sachs | ............ | G06T 5/002 |
| | | | | 382/128 |
| 2013/0089247 A1* | 4/2013 | Mercuriev | ............ | G06T 5/50 |
| | | | | 382/128 |

* cited by examiner

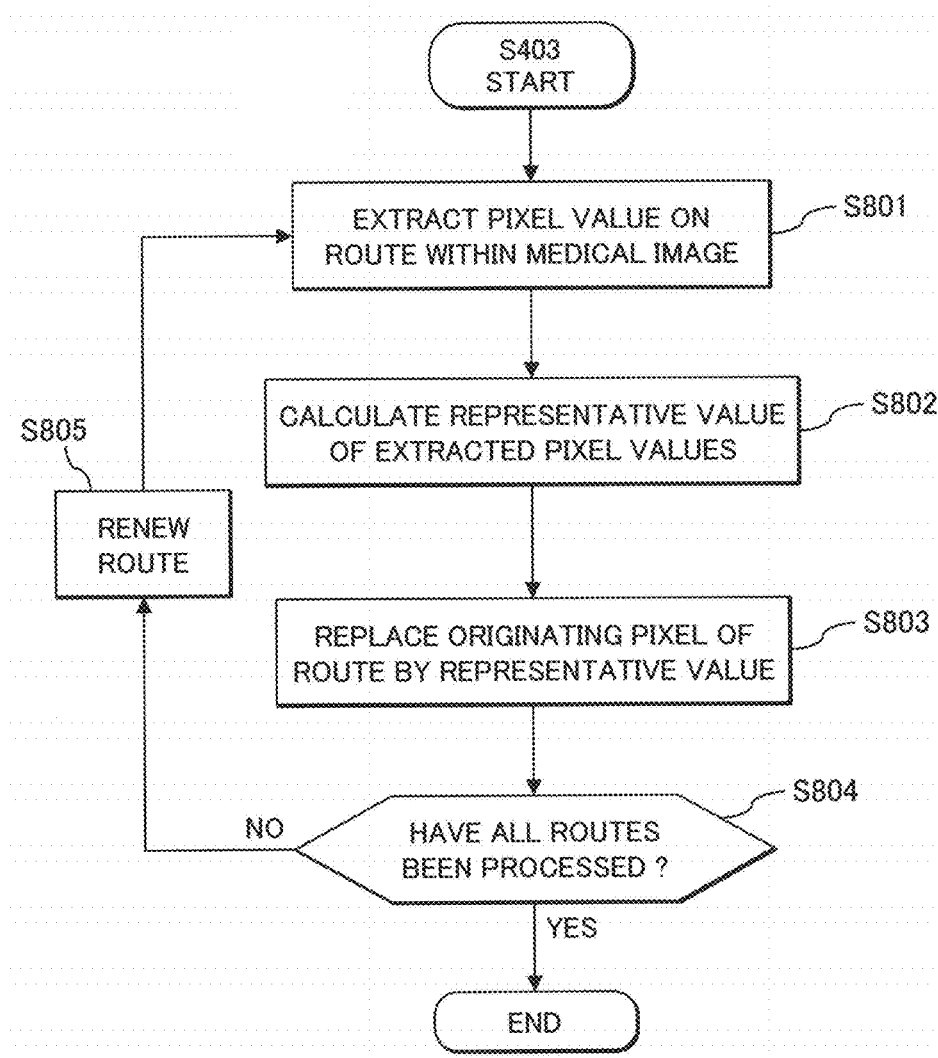

MEDICAL IMAGE PROCESSING APPARATUS AND MEDICAL IMAGE PROCESSING METHOD

CLAIM OF PRIORITY

The present application claims priority from Japanese Patent Application JP 2019-150822 filed on Aug. 21, 2019, the content of which are hereby incorporated by references into this application.

BACKGROUND OF THE INVENTION

The present invention relates to a medical image processing apparatus and a medical image processing method handling a medical image obtained by a medical image photographing device such as an X-ray CT (Computed Tomography) device, and relates to a technology for reducing noise while maintaining the boundary of the structure included in the medical image.

BACKGROUND ART

The X-ray CT device that is an example of the medical image photographing device is a device forming a tomographic image or so-called reconstruction image of an analyte by irradiating the X-ray from the surrounding of the analyte to acquire projection data at plural projection angles and subjecting the projection data to reverse projection processing. The reconstruction image formed is used for diagnosis of the analyte as a medical image. Since the noise included in the medical image becomes a hindrance of the diagnosis, various methods for reducing the noise have been developed.

Japanese Patent No. 4688269 discloses that, on a route that is formed by pixels positioned continuously from adjacent pixels that are adjacent to a noticed pixel and is set beforehand, a pixel group until the termination condition is no longer fulfilled is obtained, and the noise is removed from the noticed pixel using the pixel group obtained. According to Japanese Patent No. 4688269, the noise can be reduced regardless of presence/absence of a structure.

However, according to Japanese Patent No. 4688269, there is a case where the pixel group until the termination condition is no longer fulfilled cannot be obtained precisely with respect to a medical image including a lot of noise such as a reconstruction image formed by low-dose X-ray irradiation for reduction of radiation exposure. In such case, the boundary of the structure cannot be maintained, or reduction of the noise becomes insufficient.

SUMMARY OF THE INVENTION

Therefore, the object of the invention is to provide a medical image processing apparatus and a medical image processing method capable of reducing noise while maintaining the boundary of a structure even in a medical image including a lot of noise.

In order to achieve the object, the present invention is a medical image processing apparatus reducing noise of a medical image acquired, the medical image processing apparatus including a smoothing unit forming a smoothed image of the medical image, a route forming unit forming a route that is a pixel group positioned continuously in the smoothed image and fulfills a route condition, and a noise reducing unit extracting a pixel group corresponding to the route in the medical image and reducing noise of the medical image based on the extracted pixel group.

Also, the present invention is a medical image processing method reducing noise of a medical image acquired, the medical image processing method including a smoothing step of forming a smoothed image of the medical image, a route forming step of forming a route that is a pixel group positioned continuously in the smoothed image and fulfills a route condition, and a noise reducing step of extracting a pixel group corresponding to the route in the medical image and reducing noise of the medical image based on the extracted pixel group.

According to the present invention, it is possible to provide a medical image processing apparatus and a medical image processing method capable of reducing noise while maintaining the boundary of a structure even in a medical image including a lot of noise.

BRIEF DESCRIPTION OF THE DRAWINGS

FIG. 8 is a drawing illustrating an example of a flow of a noise reducing step of FIG. 4;

DETAILED DESCRIPTION OF THE PREFERRED EMBODIMENTS

An embodiment of a medical image processing apparatus and a medical image processing method related to the present invention will be hereinafter explained according to the attached drawings. Also, in the explanation below and the attached drawings, with respect to the constituents having the same function and configuration, duplicated explanation will be omitted by giving the same reference signs.

First Embodiment

Figure 1:
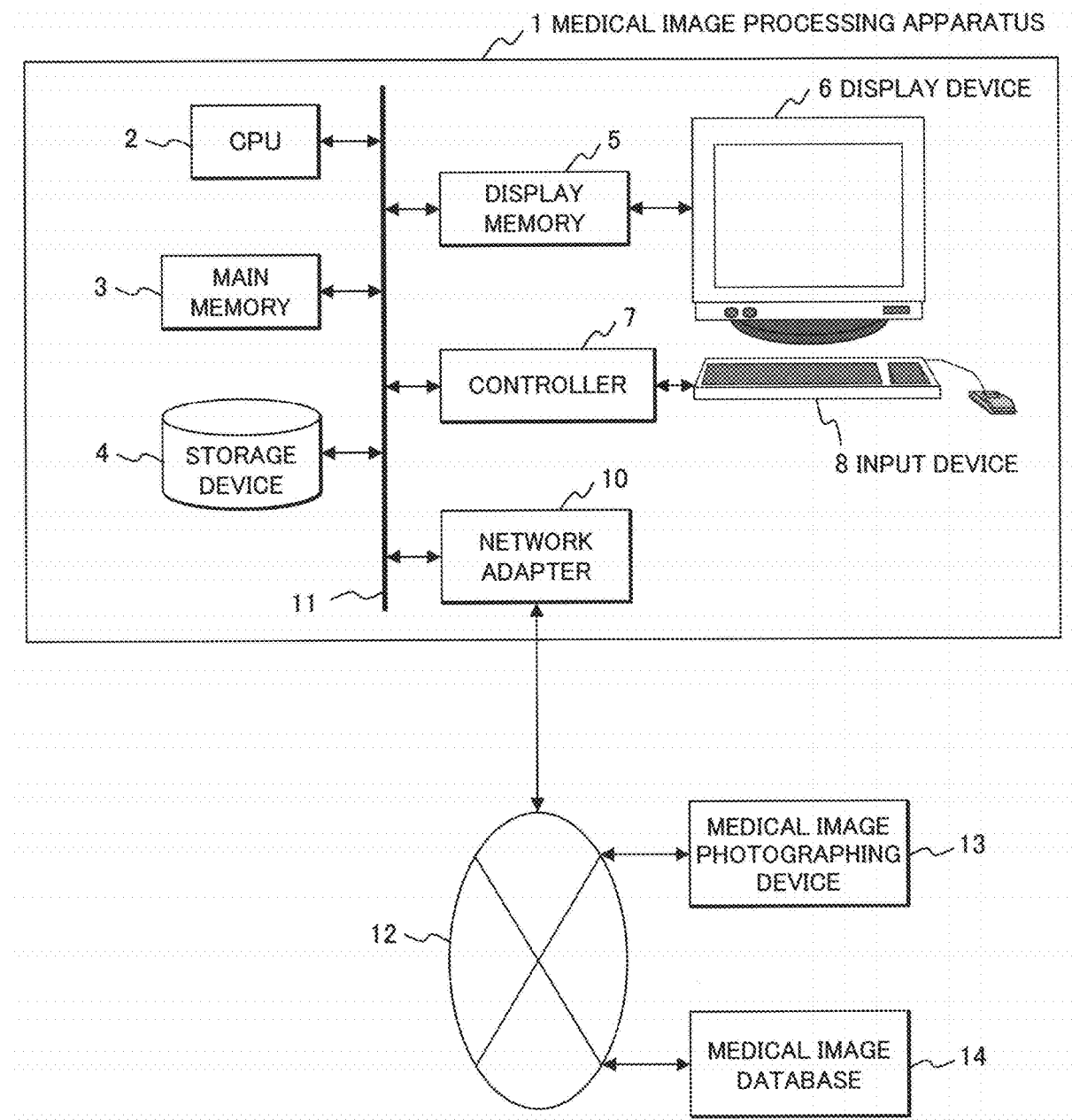
FIG. 1 is an overall configuration drawing of a medical image processing apparatus.

FIG. 1 is a drawing illustrating a hardware configuration of a medical image processing apparatus 1. The medical image processing apparatus 1 is configured by connecting a CPU (Central Processing Unit) 2, a main memory 3, a storage device 4, a display memory 5, a display device 6, a controller 7, an input device 8, and a network adapter 10 to each other by a system bus 11 so as to be capable of transmitting/receiving signals. The medical image processing apparatus 1 is connected to a medical image photographing device 13 and a medical image database 14 through a network 12 so as to be capable of transmitting/receiving signals. Here, "so as to be capable of transmitting/receiving signals" means a state capable of transmitting/receiving signals mutually or from a party to the other electrically or optically irrespective of wired or wireless.

The CPU 2 is a device controlling operation of each constituent. The CPU 2 loads a program stored in the storage device 4 and data required for executing the program to the main memory 3 and executes the same. The storage device 4 is a device for storing a program executed by the CPU 2 and the data required for executing the program, and is an HHD (Hard Disk Drive), an SSD (Solid state Device), and the like in concrete terms. Various kinds of the data are transmitted/received though the network 12 such as a LAN (Local Area Network). The main memory 3 stores the intermediate progress of the program and the calculation process executed by the CPU 2.

The display memory 5 temporarily stores display data that is for being displayed on the display device 6 such as a liquid crystal display. The input device 8 is an operation device with which an operator executes operation instructions in the medical image processing apparatus 1, and is a keyboard, mouse, touch panel, and the like in concrete terms. The mouse may be another pointing device such as a track pad and a track ball. The controller 7 is for detecting the state of the mouse, acquiring the position of the mouse pointer on the display device 6, and outputting the acquired positional information and the like to the CPU 2. The network adapter 10 is for connecting the medical image processing apparatus 1 to the network 12 such as a LAN, telephone circuit, and the Internet.

The medical image photographing device 13 is a device acquiring a medical image such as a tomographic image of an analyte. The medical image photographing device 13 is an X-ray CT device for example, and will be explained below using FIG. 2. The medical image database 14 is a database system storing the medical image acquired by the medical image photographing device 13.

Figure 2:
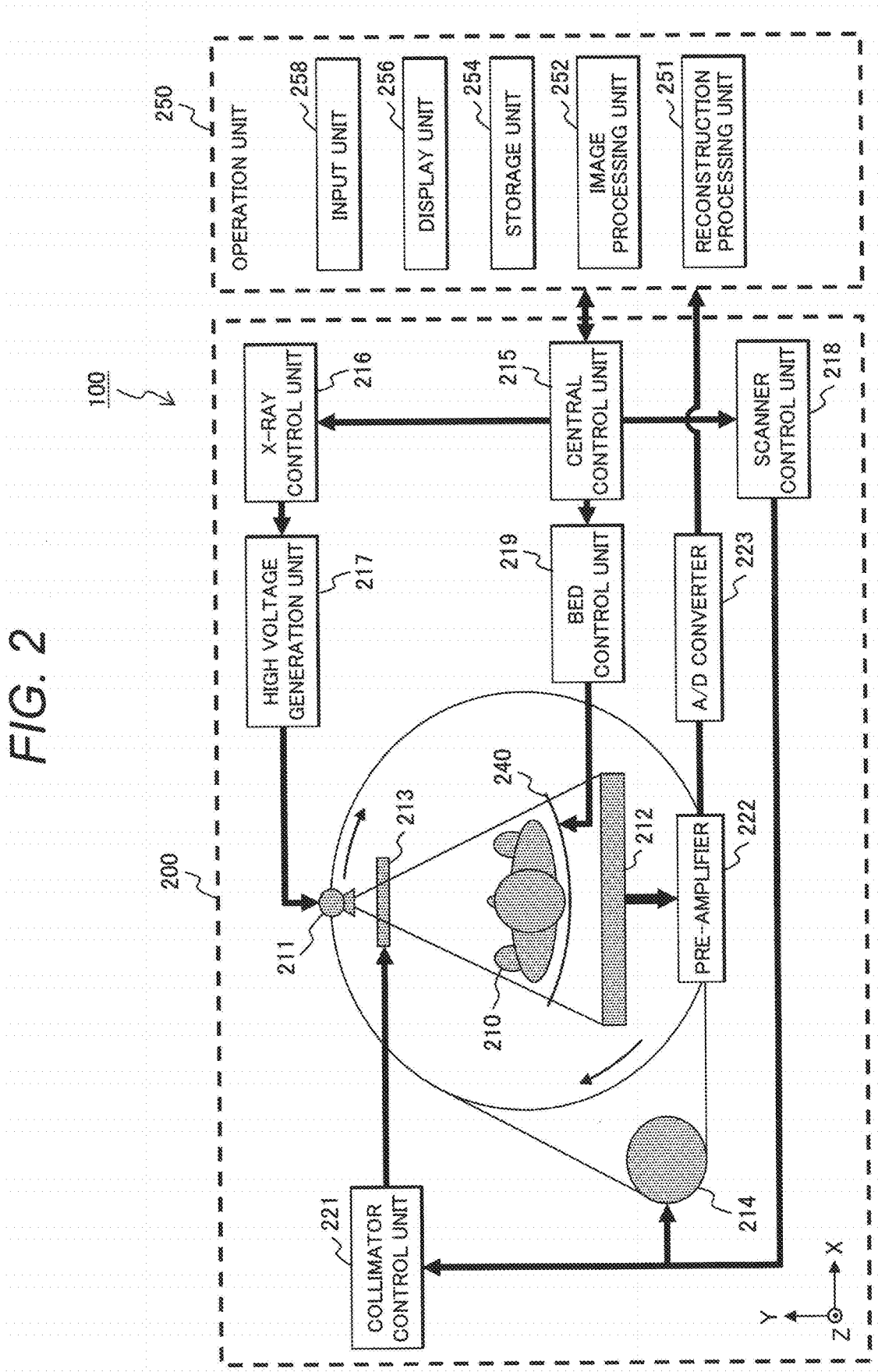
FIG. 2 is an overall configuration drawing of an X-ray CT device that is an example of a medical image photographing device.

The overall configuration of an X-ray CT device 100 that is an example of the medical image photographing device 13 will be explained using FIG. 2. Also, in FIG. 2, the lateral direction is an X-axis, the vertical direction is a Y-axis, and the direction perpendicular to the paper surface is a Z-axis. The X-ray CT device 100 includes a scanner 200 and an operation unit 250. The scanner 200 includes an X-ray tube 211, a detector 212, a collimator 213, a drive unit 214, a central control unit 215, an X-ray control unit 216, a high voltage generation unit 217, a scanner control unit 218, a bed control unit 219, a collimator control unit 221, a pre-amplifier 222, an A/D converter 223, a bed 240, and so on.

The X-ray tube 211 is a device irradiating an X-ray to an analyte 210 that is placed on the bed 240. The X-ray is irradiated from the X-ray tube 211 to the analyte as a result of high voltage generated by the high voltage generation unit 217 according to a control signal transmitted from the X-ray control unit 216 applied to the X-ray tube 211.

The collimator 213 is a device limiting the irradiation range of the X-ray irradiated from the X-ray tube 211. The irradiation range of the X-ray is set according to a control signal transmitted from the collimator control unit 221.

The detector 212 is a device measuring the spatial distribution of the transmitted X-ray by detecting the X-ray having transmitted the analyte 210. The detector 212 is disposed so as to oppose the X-ray tube 211, and a large number of detection elements are arrayed two-dimensionally within a plane that opposes the X-ray tube 211. A signal measured by the detector 212 is amplified by the pre-amplifier 222, and is converted thereafter to a digital signal by the A/D converter 223. Thereafter, the digital signal is subjected to various correction processes, and projection data is acquired.

The drive unit 214 rotates the X-ray tube 211 and the detector 212 around the analyte 210 according to a control signal transmitted from the scanner control unit 218. Projection data from plural projection angles is acquired as a result of irradiation and detection of the X-ray executed along with rotation of the X-ray tube 211 and the detector 212. The unit of data collection of each projection angle is called a view. The array of each detection element of the detector 212 arrayed two-dimensionally is called a channel in the rotation direction of the detector 212, and a row in the direction perpendicular to the channel. The projection data is identified by the view, the channel, and the row.

The bed control unit 219 controls the motion of the bed 240, and allows the bed 240 to stand still or to move at a constant speed in the Z-axis direction while irradiation and detection of the X-ray are executed. The scan executed while the bed 240 is kept stand still is called axial scan and the scan executed while the bed 240 is moved is called spiral scan respectively.

The central control unit 215 controls the operation of the scanner 200 described above according an instruction from the operation unit 250. Next, the operation unit 250 will be explained. The operation unit 250 includes a reconstruction processing unit 251, an image processing unit 252, a storage unit 254, a display unit 256, an input unit 258, and so on.

The reconstruction processing unit 251 forms a reconstructed image by subjecting the projection data acquired by the scanner 200 to reverse projection processing. The image processing unit 252 executes various imaging processes to make the reconstructed image an image suitable to diagnosis. The storage unit 254 stores the projection data, the reconstructed image, and the image obtained after the imaging processes. The display unit 256 displays the reconstructed image and the image obtained after the imaging processes. The input unit 258 is used when the operator sets acquisition conditions (tube voltage, tube current, scanning speed, and the like) of the projection data and reconstruction conditions (reconstruction filter, FOV size, and the like) of the reconstructed image.

Also, the operation unit 250 may be the medical image processing apparatus 1 illustrated in FIG. 1. In this case, the image processing unit 252 corresponds to the CPU 2, the storage unit 254 corresponds to the storage device 4, the display unit 256 corresponds to the display device 6, and the input unit 258 corresponds to the input device 8, respectively.

Figure 3:
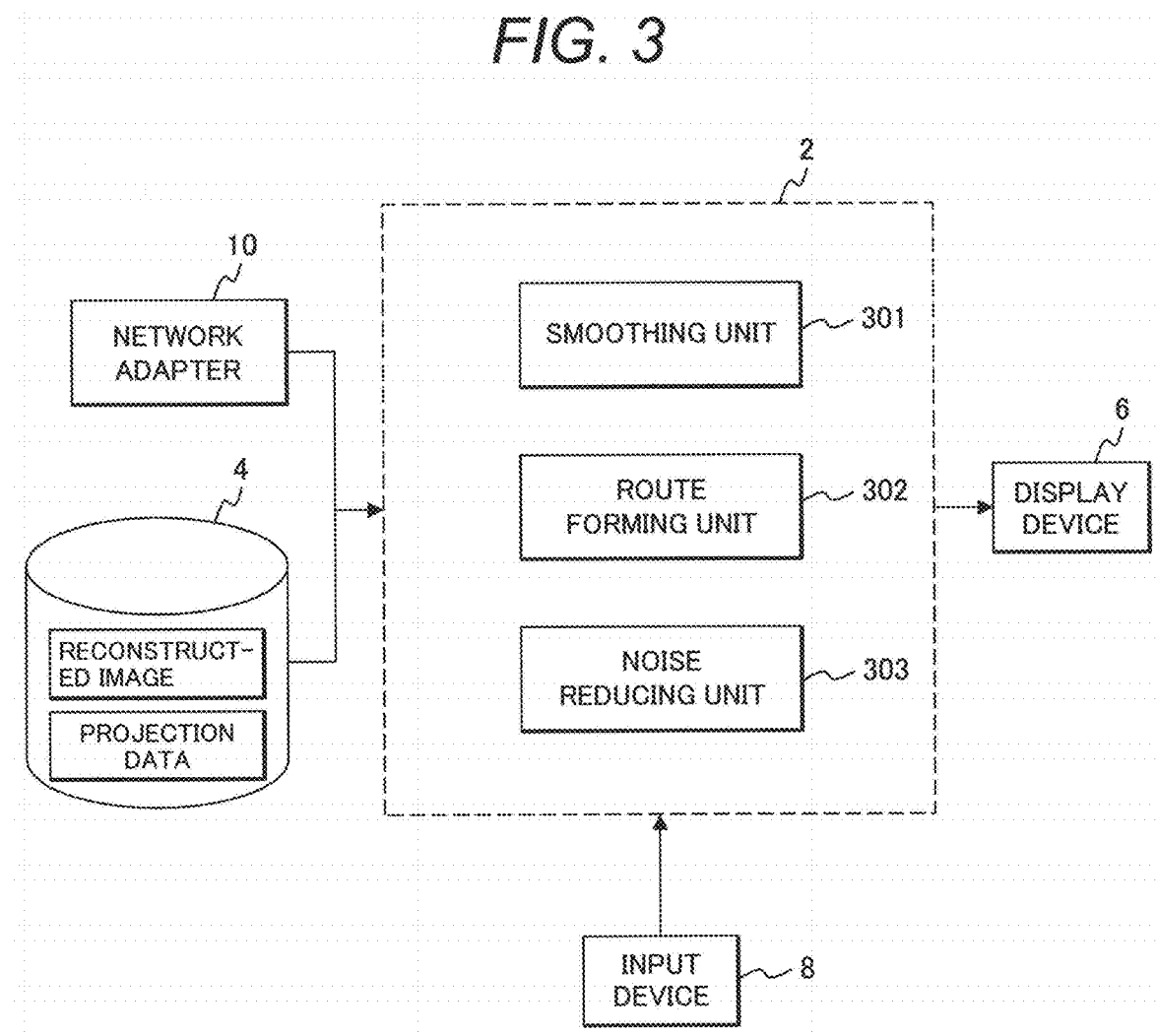
FIG. 3 is a functional block diagram of the first embodiment.

Essential parts of the present embodiment will be explained using FIG. 3. Also, these essential parts may be configured by hardware of an exclusive use, and may be configured by software operated on the CPU 2. In the explanation below, explanation will be given for a case the essential parts of the present embodiment are configured by software.

The present embodiment includes a smoothing unit 301, a route forming unit 302, and a noise reducing unit 303. Also, in the storage device 4, the reconstructed image and the projection data formed by the X-ray CT device 100 are stored. Each configuration unit will be hereinafter explained.

The smoothing unit 301 forms a medical image, for example a smoothed image of the reconstructed image. In order to form a smoothed image, the pixel value of an object pixel that becomes the object of smoothing in the medical image is changed so as to be smooth with respect to each pixel value of the pixel group adjacent to the object pixel. The simplest way is to calculate an average value or a median value from the object pixel and the adjacent pixel group, and to substitute the pixel value of the object pixel by the calculated average value or the calculated median value. Further, it is also possible to weigh and add the pixel value of the object pixel and each pixel value of the pixel group around the object pixel using a weighing factor that becomes larger as the distance from the object pixel is shorter and is less than 1, and to substitute the pixel value of the object pixel by the calculated weighed and added value. Furthermore, it is also possible to form the smoothed image by a known method other than substituting the pixel value of the object pixel by the average value, the median value, and the weighed and added value. For example, it is also possible to weigh and add a smoothed image formed by substitution of the average and the original medical image using a weighing factor less than 1. Further, as the smoothing method, it is also possible to use a noise reducing method by a known successive approximation method and a noise reducing method utilizing artificial intelligence.

In addition, it is also possible to form a smoothed image by smoothing the projection data used in formation of the reconstructed image to calculate smoothed projection data, and to subject the smoothed projection data to reconstruction processing. The projection data and the reconstructed image are read from the storage device 4, and are transmitted from the outside through the network adapter 10.

Also, whether the smoothed image is to be formed by smoothing the reconstructed image or the smoothed image is to be formed by subjecting the smoothed projection data calculated by smoothing the projection data to reconstruction processing for smoothing may be selected according to the kind of the noise reduced by the noise reducing unit 303 which will be described below. For example, it is preferable to smooth the reconstructed image when the granular noise attributable to statistical fluctuation of the X-ray is reduced, and to smooth the projection data when the linear noise namely the so-called streak-like artifact is reduced. Through the input device 8, the operator may designate the kind of the noise reduced by the noise reducing unit 303. Further, the kind of the noise may be determined according to the contour shape of the analyte 210 and deviation of disposal of a portion with a large X-ray attenuation coefficient such as a bone. For example, the granular noise is determined to be the reduction object when the contour shape is close to a perfect circle, and the linear noise is determined to be the reduction object when oblateness of the contour shape is high or when disposal of the bone deviates to a specific direction.

The route forming unit 302 forms a route that is a pixel group positioned continuously in the smoothed image formed by the smoothing unit 301 and fulfills the route condition. To be more specific, to set a pixel whose pixel value difference from the pixel value of a watched pixel is minimum as a new watched pixel out of a pixel group adjacent to the watched pixel after an originating pixel selected from the smoothed images is set as the watched pixel is repeated until the route condition is no longer fulfilled. Also, a pixel group from the originating pixel to a newest watched pixel that is the watched pixel of the time when the route condition is no longer fulfilled is formed as the route. Further, since the new watched pixel is set from the pixel group adjacent to the watched pixel based on the difference from the pixel value of the watched pixel, the route to be formed is not one that is set beforehand.

As the adjacent pixel group that is a pixel group adjacent to the watched pixel, four pixels positioned in the upper, lower, left and right directions of the watched pixel within the cross section of the medical image may be set, and eight pixels further adding four pixels positioned in the oblique directions may be set. Further, it is also possible to set six pixels as the adjacent pixel group not only four pixels in the upper, lower, left and right directions within the cross section but adding two pixels in the front and rear positioned in the direction perpendicular to the cross section, and 26 pixels adding 20 pixels positioned in the oblique directions may be set as the adjacent pixel group.

As the route condition, an upper limit value of the difference between the pixel value of the originating pixel and the pixel value of the watched pixel, an upper limit value of the number of the pixels continuing along the route namely an upper limit value of the number of times of renewal of the watched pixel, and so on are used. Also, the route condition may be set according to the smoothing strength in the smoothing unit 301. For example, the relation between the smoothing strength and the route condition obtained based on the data obtained in photographing a phantom having a known structure is stored beforehand in the storage device 4, and the route condition is set by checking the smoothing strength in the smoothing unit 301 against this relation.

Also, in the smoothed image whose smoothing strength is larger, there is a case where the route formed is widened in the normal direction of the boundary of the structure. Therefore, the upper limit value of the difference between the pixel value of the originating pixel and the pixel value of the watched pixel and the upper limit value of the number of the pixels continuing along the route which are the route condition may be set to be smaller as the smoothing strength in the smoothing unit 301 is larger. By setting the upper limit value to be small, widening of the route in the normal direction of the boundary of the structure can be suppressed.

From the medical image, the noise reducing unit 303 extracts a pixel group corresponding to the route formed in the smoothed image by the route forming unit 302, and reduces noise of the medical image based on the pixel group extracted. To be more specific, a pixel group having the same coordinates as those of the route of the smoothed image is extracted from the medical image, and the pixel value of the originating pixel of the route in the medical image is substituted by a representative value calculated using each pixel value of the pixel group extracted. Also, as the representative value, for example, an average value, a median value, and a weighed and added value calculated using a weighing factor that becomes larger as the distance from the originating pixel is shorter and is less than 1, and so on of the pixel value of the pixel group extracted from the medical image are used. Reduction of the noise may be executed for the overall medical image, and may be executed for a partial region of the medical image. The medical image whose noise has been reduced is displayed on the display device 6, and is used for diagnosis of the analyte 210.

An example of the process flow executed in the present embodiment will be explained using FIG. 4.

(S401)

The smoothing unit 301 forms a smoothed image of the medical image. The medical image and the smoothed image have the same number of the pixels, and pixels having the same coordinates correspond to each other. Even when a lot of the noise is included in the medical image, the noise is reduced in the smoothed image formed in the present step.

Figure 5:
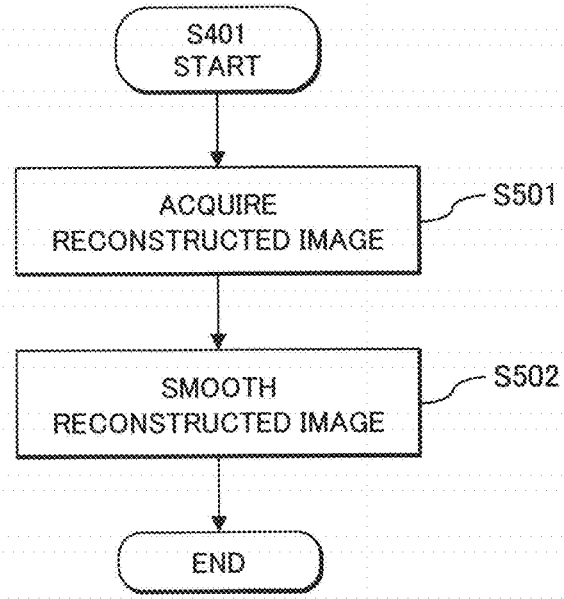
FIG. 5 is a drawing illustrating an example of a flow of a smoothing step of FIG. 4.

An example of the process flow of the present step is illustrated in FIG. 5, and each step of FIG. 5 will be hereinafter explained. Also, the medical image of FIG. 5 is the reconstructed image formed by the X-ray CT device 100.

(S501)

The smoothing unit 301 acquires a reconstructed image. The reconstructed image is read from the storage device 4, or is transmitted from the outside through the network adapter 10.

(S502)

The smoothing unit 301 smooths the reconstructed image and forms a smoothed image. Smoothing of the reconstructed image is executed by substitution of the pixel value of the object pixel by an average value of the pixel value of the object pixel and each pixel value of the pixel group adjacent to the object pixel, and so on.

Figure 6:
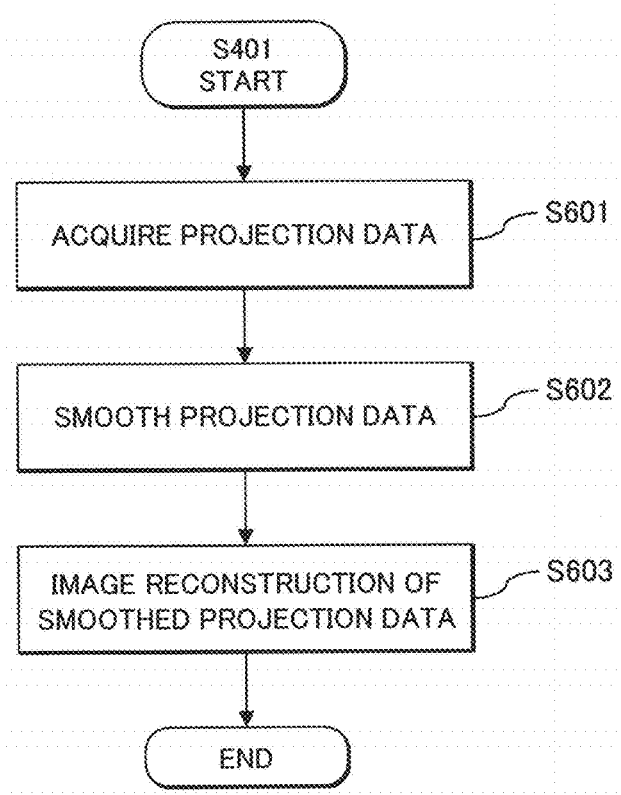
FIG. 6 is a drawing illustrating another example of a flow of the smoothing step of FIG. 4.

Another example of the process flow of S401 is illustrated in FIG. 6, and each step of FIG. 6 will be hereinafter explained. Also, the medical image of FIG. 6 is the reconstructed image formed from the projection data that is acquired by the X-ray CT device 100.

(S601)

The smoothing unit 301 acquires the projection data used in formation of the reconstructed image. The projection data is read from the storage device 4, or is transmitted from the outside through the network adapter 10.

(S602)

The smoothing unit 301 smooths the projection data and forms smoothed projection data. Smoothing of the reconstructed image is executed by substitution of the projection value of the object data by an average value of the projection value of the object data in the projection data and each projection value of the data group adjacent to the object data in the channel direction or the row direction. Further, it is also possible to weigh and add the projection value of the object data and each projection value of the data group around the object data using a weighing factor that becomes larger as the distance from the object data is shorter and is less than 1, and to substitute the projection value of the object data by the calculated weighed and added value.

(S603)

The smoothing unit 301 forms a smoothed image by subjecting the smoothed projection data formed in S602 to reconstruction processing.

Figure 4:
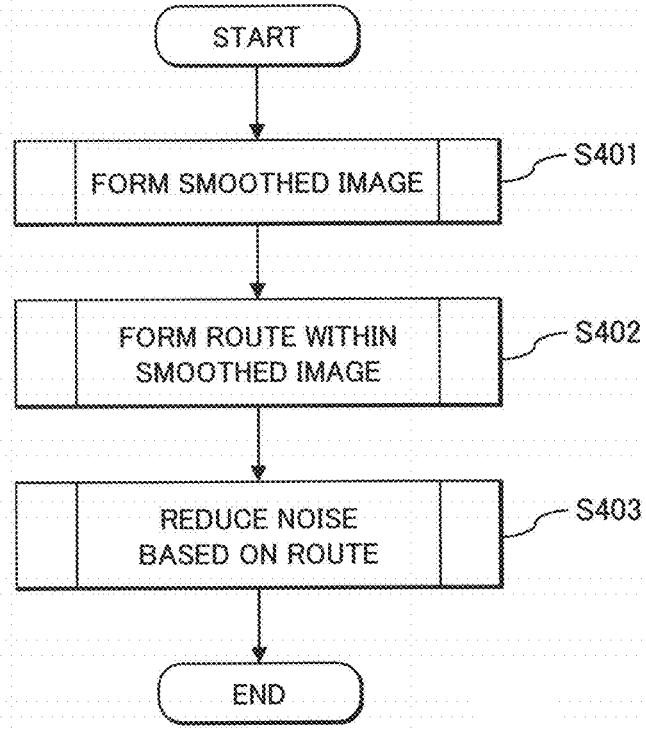
FIG. 4 is a drawing illustrating an example of a process flow of the first embodiment.

Explanation of FIG. 4 is resumed.

(S402)

The route forming unit 302 forms a route within the smoothed image formed in S401. The route formed within the smoothed image is obtained more precisely compared to a route formed within a medical image that is not smoothed.

Figure 7:
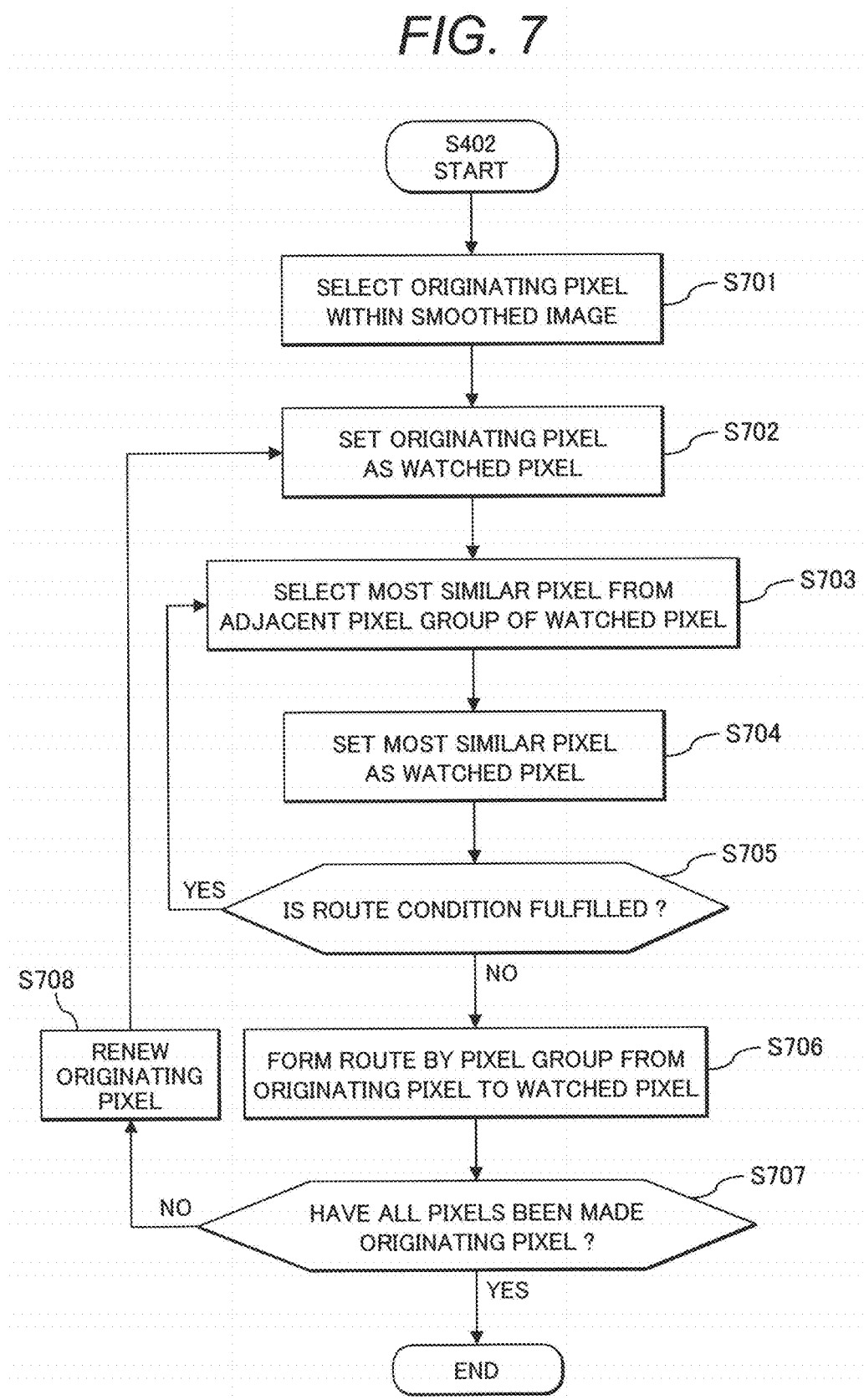
FIG. 7 is a drawing illustrating an example of a flow of a route forming step of FIG. 4.

An example of the process flow of the present step is illustrated in FIG. 7, and each step of FIG. 7 will be hereinafter explained.

(S701)

The route forming unit 302 selects an originating pixel that is a pixel becoming the point of origin within the smoothed image. Also, the originating pixel may be an optional pixel, and a pixel at the left upper end for example is selected as the originating pixel.

(S702)

The route forming unit 302 sets the originating pixel as the watched pixel. The watched pixel is a pixel becoming an object of subsequent processing.

(S703)

The route forming unit 302 selects the most similar pixel that is the most similar to the watched pixel from the adjacent pixel group that is a pixel group adjacent to the watched pixel. To be more specific, a pixel whose pixel value differs least from the pixel value of the watched pixel is selected from the adjacent pixel group.

(S704)

The route forming unit 302 sets the most similar pixel selected in S703 as a new watched pixel. In other words, the watched pixel is renewed.

(S705)

The route forming unit 302 determines whether the newest watched pixel fulfills the route condition. The process proceeds to S706 when the route condition is not fulfilled, and the process returns to S703 when the route condition is fulfilled. Also, when the process returns to S703, watched pixels of the past are not included in the most similar pixel selected in S703. By not including the watched pixels of the past in the most similar pixel, the formed route can be prevented from reciprocating between the same pixels.

(S706)

The route forming unit 302 forms a route by a pixel group from the originating pixel to the newest watched pixel. The route formed by a series of respective most similar pixels selected in S703 includes the boundary of the structure.

(S707)

The route forming unit 302 determines whether all pixels of the smoothed image have been made the originating pixel. The process flow finishes when all pixels have been made the originating pixel, and the process proceeds to S708 when there exists a pixel that has not become the originating pixel. That is to say, the route is formed for all pixels. Also, when the noise is reduced for a partial region of a medical image, whether all pixels included in the region have become the originating pixel is determined.

(S708)

The route forming unit 302 renews the originating pixel by selecting an optional pixel from a pixel group that has not yet become the originating pixel. The process returns to S702 after the originating pixel is renewed.

Explanation of FIG. 4 is resumed.

(S403)

The noise reducing unit 303 reduces noise of the medical image based on the route formed in the smoothed image in S402. By reducing noise of the medical image based on the route obtained more precisely, the noise can be reduced while maintaining the boundary of the structure.

An example of the process flow of the present step is illustrated in FIG. 8, and each step of FIG. 8 will be hereinafter explained.

(S801)

The noise reducing unit 303 selects one among the routes formed in the smoothed image, and extracts the pixel value of a pixel having coordinates corresponding to the selected route from the medical image. When the number of the pixels on the route is N, N pixel values are extracted from the medical image.

(S802)

The noise reducing unit 303 calculates a representative value of the extracted pixel values in S801. As the representative value, for example, an average value, a median value, and a weighed and added value calculated using a weighing factor that becomes larger as the distance from the originating pixel is shorter and is less than 1, and so on of the extracted pixel values are used.

(S803)

The noise reducing unit 303 substitutes the pixel value of the pixel having coordinates corresponding to the originating pixel of the route in the medical image by the representative value calculated in S802. Since the pixel value of the originating pixel in the medical image is substituted by the representative value, the noise of the medical image is reduced. The pixel value of the originating pixel in the medical image may be substituted sequentially by the representative value, and it may be configured to embed the representative value in a memory region that is prepared separately from the medical image.

(S804)

The noise reducing unit 303 determines whether all of the routes formed in the smoothed image have been processed. The process flow finishes when all routes have been processed, and the process proceeds to S805 when there exists a route that has not been processed yet.

(S805)

The noise reducing unit 303 renews the route by selecting an optional route among the routes that have not been processed yet. The process returns to S801 after the route is renewed.

By the process flow explained above, since the noise of the medical image is reduced based on the route formed in the smoothed image even in the medical image including a lot of noise, the noise can be reduced while maintaining the boundary of the structure.

Figure 9A:
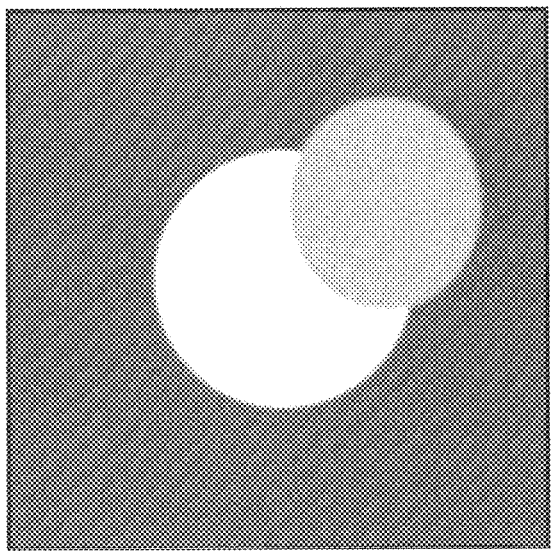
FIG. 9A is a simulation image where two kinds of the circular structures having different pixel values are disposed on a computer.
Figure 9B:
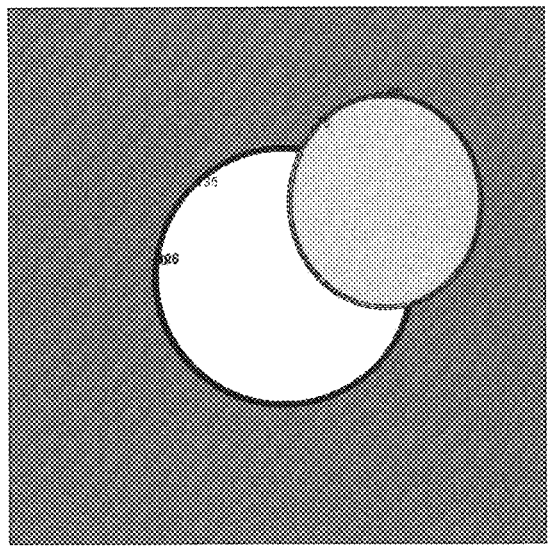
FIG. 9B is an image where contour lines tying pixels having equal pixel value by a line on the simulation image are laid on the simulation image.
Figure 9C:
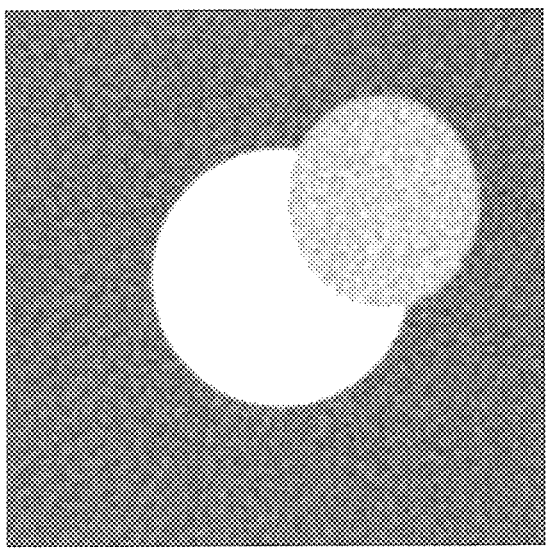
FIG. 9C is a noise-added image where random noise is added to the simulation image.
Figure 9D:
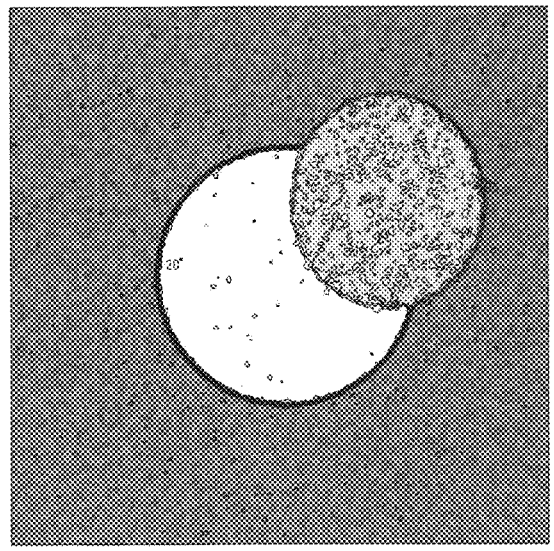
FIG. 9D is an image where contour lines are laid on the noise-added image.

The effect of the present embodiment will be explained using FIG. 9A to FIG. 12E. First, an event that the result of route formation changes by the noise will be explained using FIG. 9A to FIG. 9D. Also, FIG. 9A is a simulation image where two kinds of the circular structures having different pixel values are disposed on a computer, and FIG. 9B is an image where contour lines tying pixels having equal pixel value by a line on the simulation image are laid on the simulation image. Further, FIG. 9C is a noise-added image where random noise is added to the simulation image, and FIG. 9D is an image where contour lines are laid on the noise-added image. The route of the present embodiment comes to be formed generally along the contour lines.

The contour lines extend along the boundary of the structure in FIG. 9B, whereas the contour lines do not agree to the boundary of the structure and are spotted also in the inside of the structure and the like in FIG. 9D. That is to say, the noise can be reduced while maintaining the boundary of the structure in FIG. 9A where there is less of the random noise, whereas the boundary of the structure comes to be feathered although the noise can be reduced in FIG. 9C where there is a lot of the random noise.

Figure 10A:
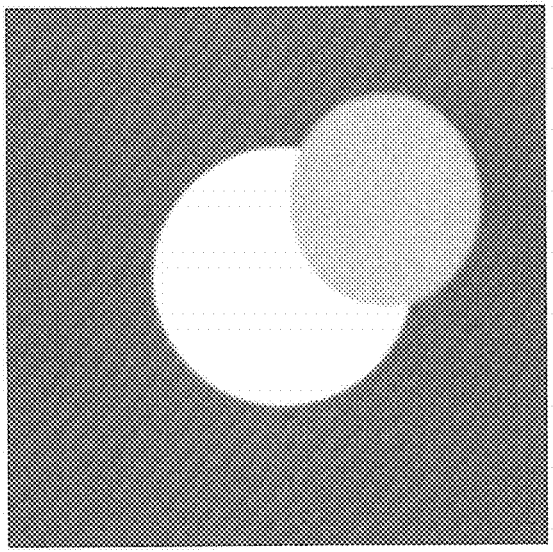
FIG. 10A is the same simulation image as FIG. 9A.

An event that the normal direction of the contour line does not change by smoothing will be explained using FIG. 10A to FIG. 10D. Also, FIG. 10A is the same simulation image as FIG. 9A, FIG. 10B is an image where the contour lines and arrows expressing the normal direction of the contour line are laid on the simulation image, FIG. 10C is a smoothed image of the simulation image, and FIG. 10D is an image where the contour lines and arrows expressing the normal direction of the contour line are laid on the smoothed image.

Figure 10B:
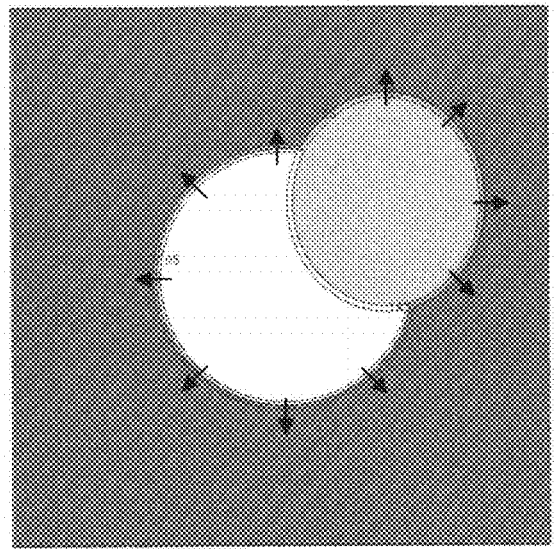
FIG. 10B is an image where the contour lines and arrows expressing the normal direction of the contour line are laid on the simulation image.
Figure 10C:
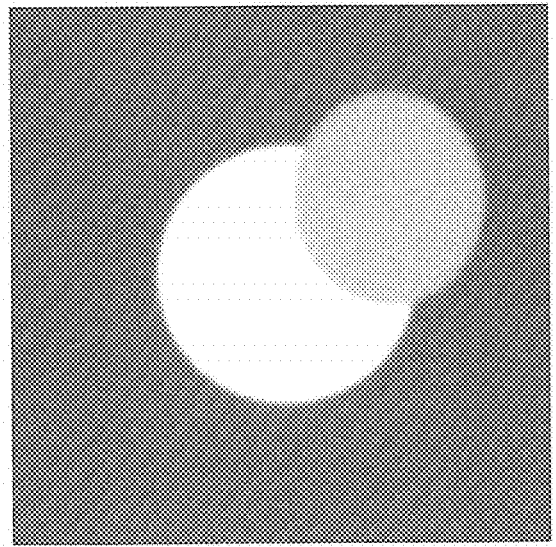
FIG. 10C is a smoothed image of the simulation image.
Figure 10D:
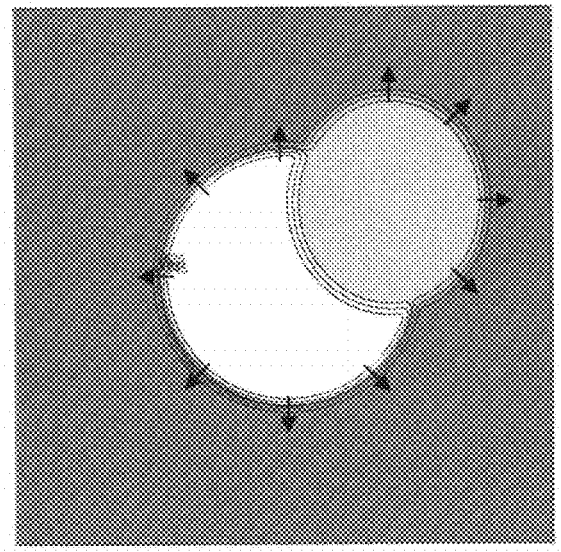
FIG. 10D is an image where the contour lines and arrows expressing the normal direction of the contour line are laid on the smoothed image.

From comparison of FIG. 10B and FIG. 10D, it is found that the interval of the contour lines is widened by smoothing of the simulation image. On the other hand, the normal line of the contour line agrees with respect to FIG. 10B and FIG. 10D, and it is found that the route extending along the boundary of the structure can be formed even when the simulation image is smoothed.

Figure 11A:
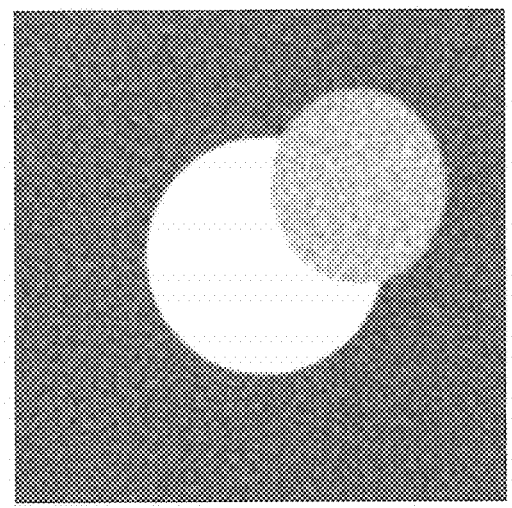
FIG. 11A is the same noise-added image as FIG. 9C.
Figure 11B:
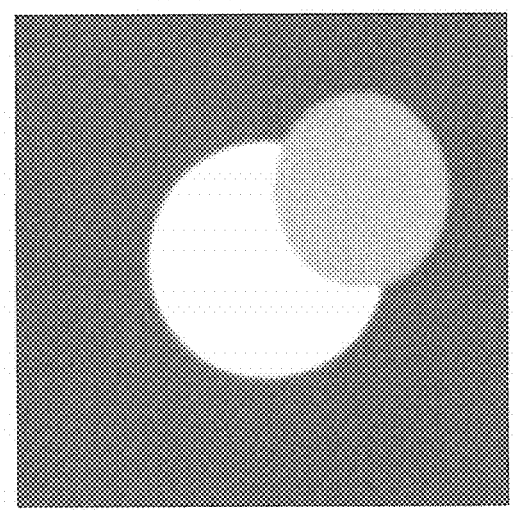
FIG. 11B is a smoothed image of the noise-added image.

The contour line of the smoothed image of the noise-added image will be explained using FIG. 11A to FIG. 11C. Also, FIG. 11A is the same noise-added image as FIG. 9C, FIG. 11B is a smoothed image of the noise-added image, and FIG. 11C is an image where the contour lines are laid on the smoothed image of FIG. 11B.

Figure 11C:
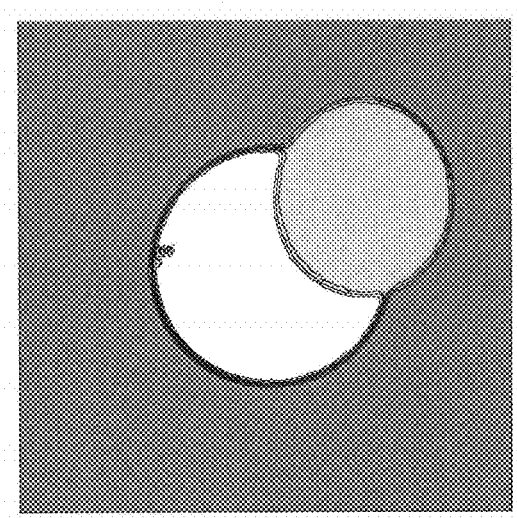
FIG. 11C is an image where the contour lines are laid on the smoothed image of FIG. 11B.

In FIG. 11C, there is no disagreement between the boundary of the structure and the contour lines as FIG. 9D, and the contour lines extend along the boundary of the structure similarly to FIG. 9B. That is to say, by using the route formed in the smoothed image of the noise-added image, the noise can be reduced while maintaining the boundary of the structure.

Figure 12A:
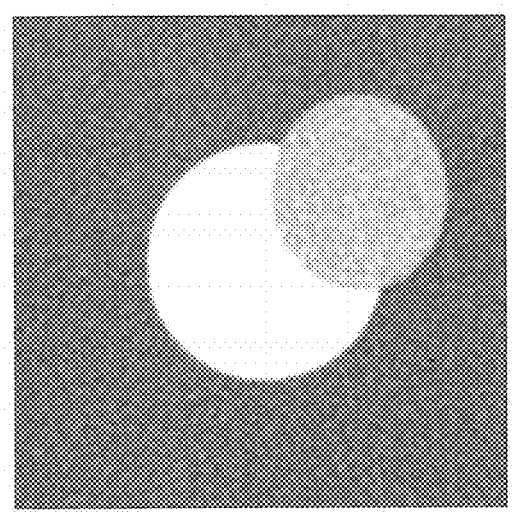
FIG. 12A is the same noise-added image as FIG. 9C.
Figure 12B:
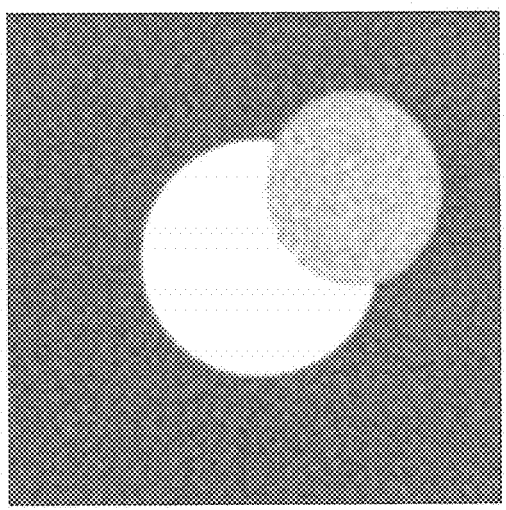
FIG. 12B is an image where the noise is reduced from the noise-added image by a method of Japanese Patent No. 4688269.
Figure 12C:
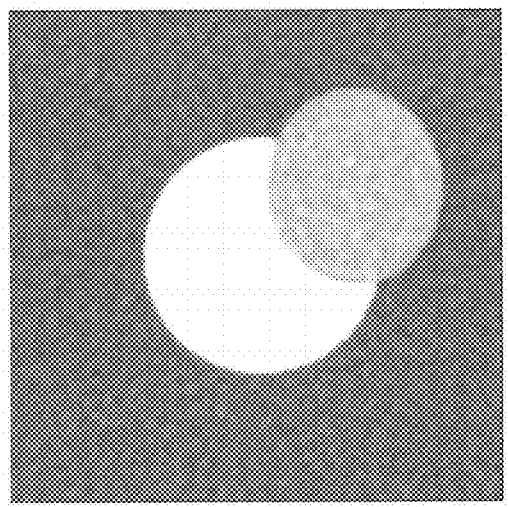
FIG. 12C is an image where the noise is reduced from the noise-added image by the present embodiment.
Figure 12D:
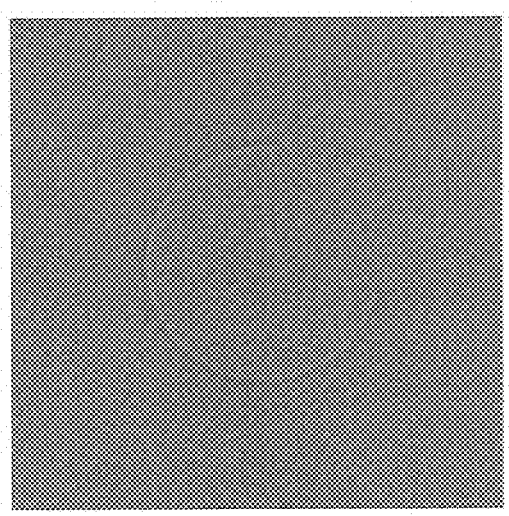
FIG. 12D is a difference image of FIG. 12A and FIG. 12B.
Figure 12E:
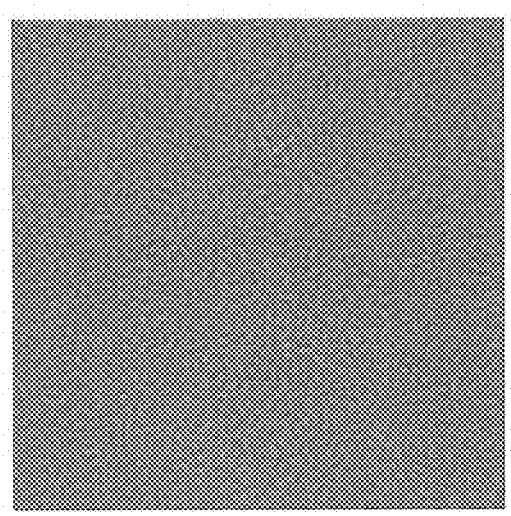
FIG. 12E is a difference image of FIG. 12A and FIG. 12C.

The effect of the present embodiment will be explained using FIG. 12A to FIG. 12E. Also, FIG. 12A is the same noise-added image FIG. 9C, FIG. 12B is an image where the noise is reduced from the noise-added image by a method of Japanese Patent No. 4688269, and FIG. 12C is an image where the noise is reduced from the noise-added image by the present embodiment. Also, FIG. 12D is a difference image of FIG. 12A and FIG. 12B, and FIG. 12E is a difference image of FIG. 12A and FIG. 12C.

When FIG. 12B and FIG. 12C are compared to each other, the SD (Standard Deviation) value of the pixel value which is one of indices of the noise is generally equal, and the both have a generally equal noise reduction effect. On the other hand, when FIG. 12D and FIG. 12E are compared to each other, there is a position where the difference of the pixel value from that of the surroundings is large in the boundary of the structure in FIG. 12D, whereas such position is not seen in FIG. 12E. The position where the difference of the pixel value from that of the surroundings is large is caused because the boundary of the structure is feathered accompanying reduction of the noise. That is to say, the noise is reduced while feathering the boundary of the structure according to the method of Japanese Patent No. 4688269, whereas FIG. 12E has shown an event that the noise can be reduced while maintaining the boundary of the structure according to the present embodiment.

The medical image processing apparatus and the medical image processing method of the present invention are not limited to the embodiment described above, and can be concretized with the constituents being modified within a range not departing from the gist of the present invention. Further, plural constituents disclosed in the embodiment described above may be combined appropriately. Furthermore, it is also possible to delete some constituents from all constituents shown in the embodiment described above.

REFERENCE SIGNS LIST

1: medical image processing apparatus, 2: CPU, 3: main memory, 4: storage device, 5: display memory, 6: display device, 7: controller, 8: input device, 10: network adapter, 11: system bus, 12: network, 13: medical image photographing device, 14: medical image database, 100: X-ray CT device, 200: scanner, 210: analyte, 211: X-ray tube, 212: detector, 213: collimator, 214: drive unit, 215: central control unit, 216: X-ray control unit, 217: high voltage generation unit, 218: scanner control unit, 219: bed control unit, 221: collimator control unit, 222: pre-amplifier, 223: A/D converter, 240: bed, 250: operation unit, 251: reconstruction processing unit, 252: image processing unit, 254: storage unit, 256: display unit: 258: input unit, 301: smoothing unit, 302: route forming unit, 303: noise reducing unit

What is claimed is:

1. A medical image processing apparatus reducing noise of a medical image acquired, the medical image processing apparatus comprising:
    a smoothing unit forming a smoothed image of the medical image, wherein
        the smoothed image is formed by at least one of:
            smoothing the medical image by calculating one of an average pixel value and a median pixel value of each of an object pixel and an adjacent pixel group, and substituting the pixel value of the object pixel with the calculated average value or the calculated median value,
            using a noise reducing method by a successive approximation method or by utilizing artificial intelligence, and
            acquiring smoothed projection data by smoothing projection data that is used in formation of the medical image and subjecting the smoothed projection data to reconstruction processing;
    a route forming unit forming a route that is a first pixel group having coordinates positioned continuously in the smoothed image and fulfills a route condition, wherein the route forming unit forms the first pixel group from an originating pixel to a newest watched pixel as the route by repeating setting a pixel where a difference from a pixel value of a watched pixel is minimum from a third pixel group adjacent to the watched pixel as a new watched pixel until the route condition is no longer fulfilled after the originating pixel selected from the smoothed image is set as the watched pixel; and
    a noise reducing unit configured to:
        extract a second pixel group from the medical image corresponding to the coordinates of the first pixel group by calculating a representative pixel value of the coordinates; and
        reduce noise of the medical image based on the extracted second pixel group by substituting a pixel value in the medical image with the representative pixel value.

2. The medical image processing apparatus according to claim 1, wherein the route forming unit sets the route condition according to smoothing strength in the smoothing unit.

3. The medical image processing apparatus according to claim 2,
    wherein the route condition is an upper limit value of a difference between a pixel value of an originating pixel and a pixel value of a watched pixel of the route, and
    the route forming unit sets the upper limit value to be smaller as the smoothing strength is larger.

4. The medical image processing apparatus according to claim 2,
    wherein the route condition is an upper limit value of the number of continuous pixels of the route, and
    the route forming unit sets the upper limit value to be smaller as the smoothing strength is larger.

5. The medical image processing apparatus according to claim 1,
    wherein when the kind of noise reduced by the noise reducing unit is granular noise, the smoothing unit forms the smoothed image by smoothing the medical image, and
    when the kind of noise reduced by the noise reducing unit is linear noise, the smoothing unit forms the smoothed image by acquiring smoothed projection data by smoothing projection data that is used in formation of the medical image and subjecting the smoothed projection data to reconstruction processing.

6. The medical image processing apparatus according to claim 1, wherein the route forming unit selects all pixels in the smoothed image as the originating pixels, and forms the route with respect to each of the originating pixels.

7. The medical image processing apparatus according to claim 1, wherein the noise reducing unit calculates a representative value of the pixel value of the extracted second pixel group, and substitutes a pixel value of a pixel corresponding to an originating pixel of the route in the medical image by the representative value.

8. The medical image processing apparatus according to claim 7, wherein the representative value is any one of an average value, a median value, and a weighed and added value calculated using a weighing factor that becomes larger as a distance from an originating pixel is shorter and is less than 1 of pixel values of the extracted second pixel group.

9. A medical image processing method reducing noise of a medical image acquired, the medical image processing method comprising:
    a smoothing step of forming a smoothed image of the medical image wherein,
        the smoothed image is formed by at least one of:
            smoothing the medical image by calculating one of an average pixel value and a median pixel value of each of an object pixel and an adjacent pixel group, and substituting the pixel value of the object pixel with the calculated average value or the calculated median value,
            using a noise reducing method by a successive approximation method or by utilizing artificial intelligence, and
            acquiring smoothed projection data by smoothing projection data that is used in formation of the medical image and subjecting the smoothed projection data to reconstruction processing;
a route forming step of forming a route that is a first pixel group positioned continuously in the smoothed image and fulfills a route condition, wherein the route forming unit forms the first pixel group from an originating pixel to a newest watched pixel as the route by repeating setting a pixel where a difference from a pixel value of a watched pixel is minimum from a third pixel group adjacent to the watched pixel as a new watched pixel until the route condition is no longer fulfilled after the originating pixel selected from the smoothed image is set as the watched pixel; and
a noise reducing step of:
  extracting a second pixel group from the medical image corresponding to the coordinates of the first pixel group by calculating a representative pixel value of the coordinates and;
  reducing noise of the medical image based on the extracted second pixel group by substituting a pixel value in the medical image with the representative pixel value.

\* \* \* \* \*